Dec. 24, 1963     W. B. McCARDELL     3,115,052
TOOTH FORMING TOOL
Filed Dec. 12, 1960     3 Sheets-Sheet 1
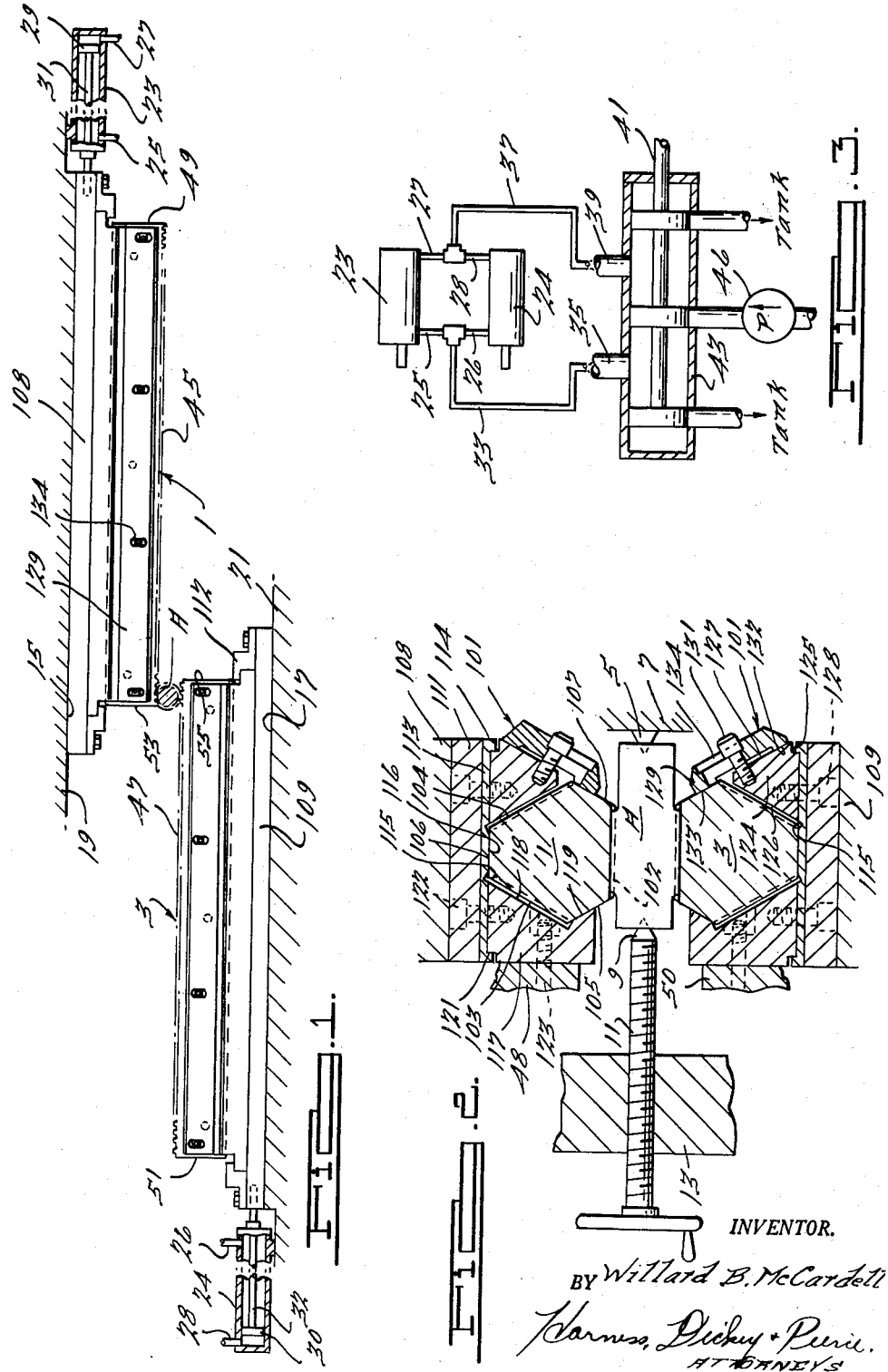
INVENTOR.
BY Willard B. McCardell
Harness, Dickey & Pierce
ATTORNEYS

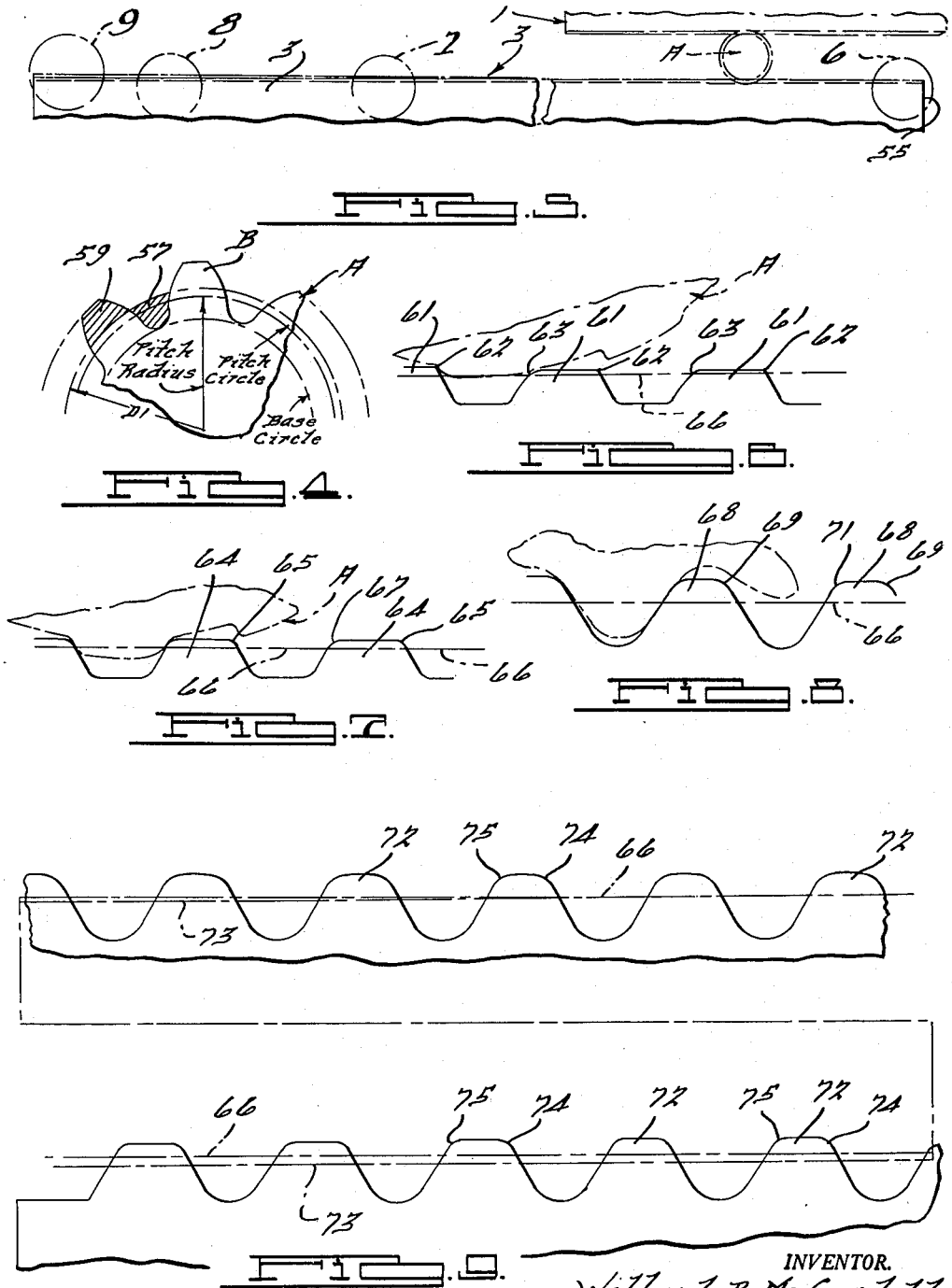

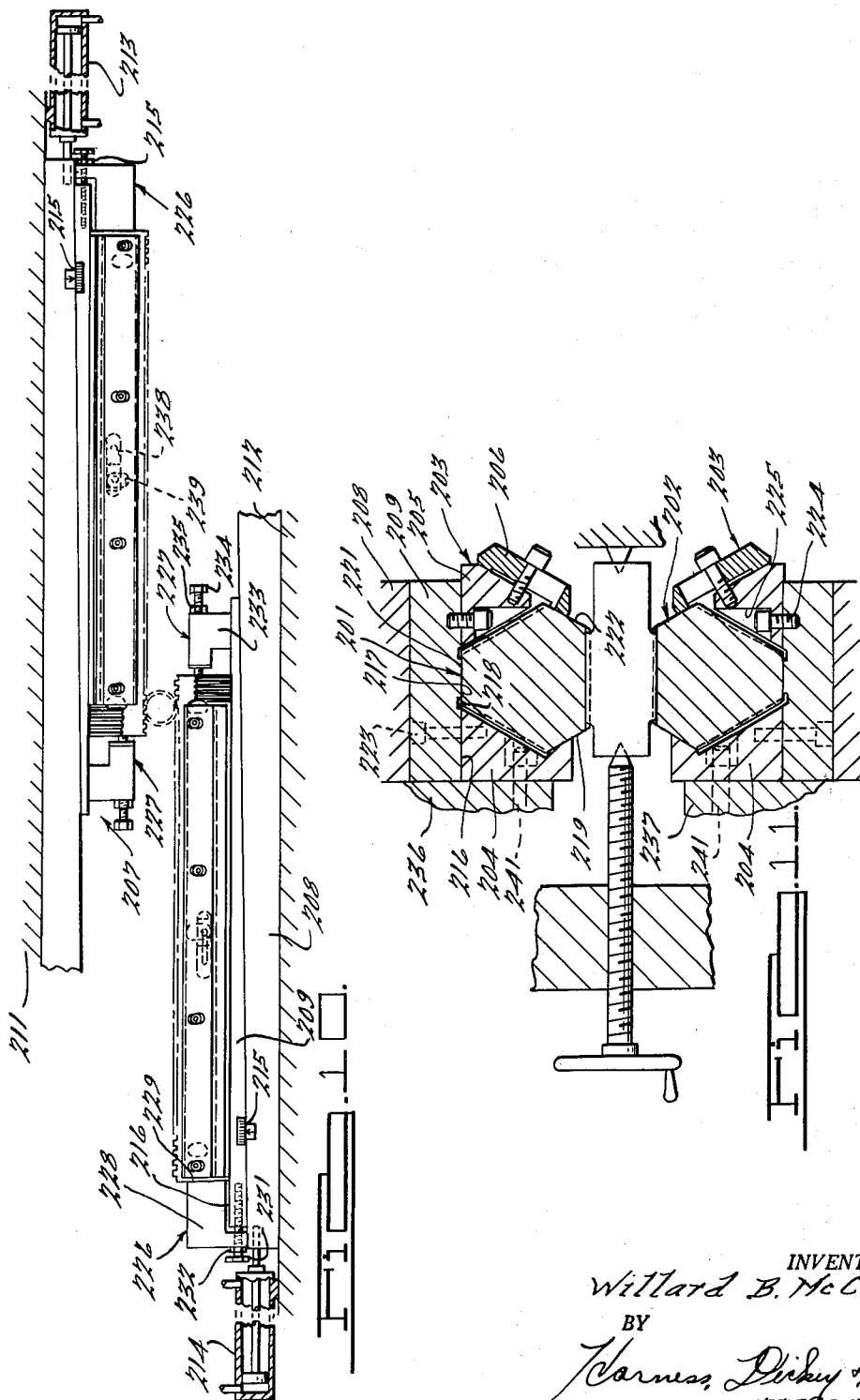

United States Patent Office 3,115,052
Patented Dec. 24, 1963

3,115,052
TOOTH FORMING TOOL
Willard B. McCardell, Royal Oak, Mich., assignor to Michigan Tool Company, Detroit, Mich., a corporation of Delaware
Filed Dec. 12, 1960, Ser. No. 75,361
2 Claims. (Cl. 80—16)

This invention relates to the cold rolling of external teeth on articles such as spline shafts, worms, gears, and the like, and more particularly, to improved tools for pressure forming such teeth. This application is related to copending application Serial No. 707,244 filed January 6, 1958, now U.S. Patent No. 3,015,243 and entitled "Tool for Pressure Forming Tooth Elements" and copending application Serial No. 837,262 filed August 31, 1959, now U.S. Patent No. 2,995,964 entitled "Machine" both applications being in the name of Joeph C. Drader and assigned to the same assignee as present application.

It is an object of the present invention to provide a novel and improved tool construction for pressure forming teeth which greatly reduces the cost per part of producing a large number of workpieces as compared with previously known tools of this type.

It is another object to provide an improved tooth forming tool of the above nature which eliminates the need for regrinding or otherwise refinishing pressure forming tools of this type, together with the costs attendant upon such refinishing.

It is a further object to provide an improved tool of the above character which can be discarded after use but which nevertheless results in a low unit cost for high quantity production.

It is a further object to provide an improved tooth forming tool of this nature which, by eliminating the need for regrinding, will obviate the possibility of faults being found in the tool during the regrinding operation which would cause the regrinding expense to be wasted.

It is another object to provide an improved tool of the above character which incorporates a plurality of sets of forming teeth, but in which the grinding of these plurality of sets does not necessitate a much greater expense than the grinding of a single set of forming teeth on previously known types of tools.

It is a further object to provide an improved toothforming tool of this character having three sets of forming teeth formed on one integral unit, in which the material and labor costs for forming this unit are substantially less than the costs of three separate units.

It is also an object to provide an improved tooth-forming tool of this nature which, by permitting the tool to continue its usefulness even if a tooth breakage occurs in one set of teeth, is extremely economical as compared with the cost of providing a plurality of sets of conventional tools which would incorporate the same convenience in case of tooth breakage.

It is also an object, in one form of the invention, to provide an improved tooth-forming tool assembly having the above characteristics, which incorporates novel and compact means for adjusting the distance between the opposed working faces of the oppositely moving tools.

Other objects, features and advantages of the present invention will become apparent from the subsequent description, taken in conjunction with the accompanying drawings, in which:

FIGURE 1 is a partially schematic side elevational view of a pair of tooth-forming tools incorporating the principles of the invention, the tools shown as being mounted in position for a tooth-forming operation;

FIGURE 2 is an enlarged cross sectional view in elevation of upper and lower tools as shown in FIGURE 1, illustrating the clamping and supporting means for the tools as well as their configuration;

FIGURE 3 is a schematic hydraulic diagram showing the manner in which fluid pressure is supplied to the tool actuating cylinders;

FIGURE 4 is a fragmentary view of a typical involute spline which may be formed by means of the invention;

FIGURE 5 is a side elevational view of one set of teeth on one of the tools, shown to illustrate the relationship among various types of teeth in each set;

FIGURE 6 is an enlarged fragmentary elevational view showing a group of teeth in the circle marked 6 of FIGURE 5 at the leading end of the tool, together with a portion of a workpiece;

FIGURE 7 is a similar fragmentary elevational view of the several teeth in the circle marked 7 of FIGURE 5;

FIGURE 8 is a view similar to FIGURES 6 and 7 taken in the circle marked 8 of FIGURE 5;

FIGURE 9 is a fragmentary elevational view of a group of teeth in the circle marked 9 of FIGURE 5, this view being broken for purposes of the drawing;

FIGURE 10 is a view similar to FIGURE 1 showing a modified form of the invention in which means are provided for adjusting the distance between the opposing faces of the two tools; and FIGURE 11 is a view similar to FIGURE 2 showing the cross-sectional configuration and supporting components of the tools of FIGURE 10.

In general terms, the illustrated embodiments of the invention are adapted to incorporate the tooth-forming principles set forth in the above mentioned copending application Serial No. 707,244, but to do so in a manner which is extremely economical as compared with the mechanisms described in the aforementioned applications. Basically, the invention includes the provision of a plurality of sets of forming teeth on each of the two rack bars which are oppositely moved during the tooth forming operation. Only one set of teeth on each rack bar is used at a time, and when this set has been used a sufficient number of times so that it would normally have to be reground before further use, the securing means for the rack is released and the rack is lifted, rotated on its own axis and replaced in the holder so that an unused set of teeth is in operative position. After all the sets of teeth on each rack have been so used (three sets being shown on each rack in the illustrated embodiment of the invention), the rack may be discarded.

It has been found that, when considering the material and labor necessary to form racks with only a single set of teeth having the same usefulness as racks made according to the principles of the invention, substantial savings are effected as set forth in the above stated list of objects of the invention.

Before describing in detail the actual construction of racks made in accordance with the present invention, a more general description of the tooth forming method used in these racks will be set forth in order to further an understanding of the invention. One embodiment of the invention is illustrated in FIGURES 1 to 5 wherein the part A is shown in position between the upper and lower tools generally indicated at 1 and 3 embodying the invention, the tools being shown at the beginning of the operation which will form splines on the surface of the part A. The part A is supported by means which permit it to rotate freely on a fixed axis when urged to do so by the tools 1 and 3. To illustrate such means there is shown a fixed center pin extending from the surface 7 which may be considered as a part of the apparatus or machine which carries the tools 1 and 3. The part supporting means is shown as also including an adjustable center pin 9 on the end of an axially adjustable member 11, shown as a handwheel-operated, screw threaded shaft, that is carried by a support 13 which may also be considered a part of the apparatus on which the tools are mounted. The support 13 may be made slidable along the axis of member 11 so as to provide an additional adjustment whereby varying length of parts A can be handled by the machine.

The upper and lower tools 1 and 3 are shown as identical rack bars with teeth on their inside faces that engage the surface of part A. The bars are movable lengthwise by suitable means and are illustrated herein as being slidable on ways 15 and 17, as shown, which are formed on the head 19 and bed 21, respectively, of the machine which carries the tools. Those in the art will recognize that members 7, 13, 19, and 21 may all be made parts of the frame of a machine embodying the necessary elements to carry out the invention and that variations in structure may be employed to perform the functions indicated.

Means are provided to simultaneously slide the tools 1 and 3 in opposite directions. This means is illustrated as a pair of identical pressure cylinders 23, 24 having pressure ports 25, 26 at one end and pressure ports 27, 28 at the opposite end. Working in the cylinders are pistons 29, 30 having rods 31, 32. The rod 31 is connected to the trailing end of tool 1 and the rod 32 is connected to the trailing end of tool 3. Suitable valving can be used with the cylinders 23, 24 to actuate and synchronize their operation so that the rack bars 1 and 3 move at the same instant and with the same velocities in opposite directions. To illustrate this, FIGURE 3 shows the cylinder ports 25, 26 joined together by a T and connected by line 33 to valve port 35 while the cylinder ports 27, 28 are joined together by a T and connected by line 27 to valve port 39. A three land spool valve 41 in valve casing 43 can be shifted to the right to connect ports 25, 26 to pressure from pump 46 and ports 27, 28 to tank; and by shifting to the left, the reverse condition is obtained wherein ports 25, 26 are connected to tank and ports 27, 28 to pressure. In addition, members 48 and 50 connected to racks 1 and 3 respectively may carry facing racks meshing with an interposed pinion (not shown) for synchronizing the rack movement, as set forth in the above-mentioned application Serial No. 837,262, now U.S. Patent No. 2,995,964.

The operation of the apparatus is evident from the above description. With the tools in the position shown, the part A is mounted on supports 5 and 9 which permit it to be rotated by the tools. The valve 41 is moved to the left to connect ports 27 and 28 to pressure and ports 25 and 26 to exhaust so that tool 1 moves to the left and tool 3 to the right. The spacing between the working faces 45 and 47 of the tools 1 and 3 is less than the diameter of part A, hence the shape of the faces 45 and 47 is impressed or conjugated on the periphery of the part. The end of the stroke is reached when the trailing ends 49 and 51 of the tools pass over the part A at which point the part A may be removed from centers 5 and 9, and the valve 41 moved to the right in FIGURE 3 to return tools 1 and 3 to the starting positions shown in FIGURE 1 wherein the leading ends 53 and 55 thereof are adjacent the part A. A new part A can then be inserted in the apparatus and the cycle repeated.

In rolling grooves of the desired shape into the surface of part A, the material from which part A is made (ordinarily wrought steel) will flow adjacent the surface in radial and tangential directions so that there are grooves of less than the original diameter of the part and ridges of greater than the original diameter. Where the final form of the part is known and must be accurately maintained, this flow of material should be taken into account in selecting the diameter of that portion of part A which is subjected to the action of tools 1 and 3.

To illustrate by consideration of a common but very important shape that may be rolled by means of the invention there is shown in FIGURE 4 a portion of a cross-section of part A in finished form in which the part has involute teeth or splines B. Since no metal is removed in the cold rolling operation, the diameter of the part prior to rolling cannot be either the final O.D. or the root diameter and it is only by chance that it can properly be the pitch diameter. The rolling diameter $D_1$ of the part A is selected so that the area 57 of removed tooth material below the $D_1$ periphery is equal to the area 59 of tooth material on a greater diameter than $D_1$. The diameter $D_1$, or substantially this diameter, is taken as the tool pitch diameter in the case of gear-like tools and defines the pitch line for rack type tools such as tools 1 and 3. The pressure angle of the teeth of gear type tools at diameter $D_1$ and the pressure angle or obliquity of the teeth of rack type tools is the angle whose cosine is $D/D_1$ times the cosine of the pressure angle at pitch diameter of teeth B where D is the pitch diameter of part A. With such a construction, the circular pitch of the teeth on the tool, as measured on the pitch line thereof, corresponds with the circular pitch of the teeth on the workpiece, as measured on the diameter $D_1$ of the workpiece. The tools 1 and 3 are spaced apart so that at least near the trailing edges 49 and 51 thereof their working faces 45 and 47 provide a clearance equal to the root diameter of the part A less about three to four thousandths to take up elasticity of the members and compression of oil films under rolling pressure. At the present time a linear pitch line velocity for rack type tools of about 300 to 575 inches per minute of each tool is thought to be proper, 575 inches per minute being preferred. For rotary tools, the velocities may be substantially greater, for example up to ten times as much. If it is desired to positively drive the part A through gearing, etc., other than by the tools, though this is not preferred, the surface speeds of the part and tool should, of course, be the same. Only one pass of the tool with no reversal of direction during the working stroke is preferred.

The spacing of the working faces 45 and 47 of the tools 1 and 3 is regulated so that the depth of the impression made in part A gradually increases as the rolling operation proceeds. In other words, the faces 45 and 47 approach closer together in a plane through centers 5 and 9 as the length of stroke increases. This convergence of the tool faces toward each other with increasing length of stroke is preferably accomplished by tapering each tool uniformly, e.g., about 0.001 inch per inch per tool, though it is within the broad purview of the invention to provide the taper in other ways such as tapering only one tool and suitably mounting the part A to avoid eccentricity. The taper can be obtained by inclining the pitch lines of the tool teeth, by gradually increasing the height of the tool teeth while holding the pitch line level, or by a combination of the two methods.

FIGURES 5 to 9 show the form of a set of teeth on bottom tool 3, it being understood that a tooth set on the upper tool is preferably identical to it. In this tool, the taper is provided by gradually increasing the height of the tool teeth while holding the pitch line level. More particularly, the addendum of the first tooth 61 at the leading end 55 of the tool is relatively short, and the addenda of the succeeding teeth 61 are progressively higher.

In order to permit teeth 61 to cause proper rotation of the initially engaged workpiece, the forward edges 62 of these teeth are relatively sharp, as seen in FIGURE 6. Due to the fact that at the beginning of the operation there is relatively little contact between the tools and workpiece, sharp edges 62 of teeth 61 will insure proper rotation of workpiece A and will prevent slippage. The rear edges 63 of teeth 61 are rounded as seen in FIGURE 6 to produce the proper conjugate action.

As soon as the teeth on workpiece A are formed deeply enough to provide a more positive drive, the leading edges of the rack teeth are provided with a relatively small radius, as seen in FIGURE 7 which shows teeth 64 at an intermediate portion of the rack. It should be noted that the addenda of teeth 64 are progressively increasing but are still not full, and the radii 65 on the leading edges of these teeth do not extend below pitch line 66. The radii 67 on the rear edges of teeth 64 are full radii to facilitate flow of metal similar to radii 63 of teeth 61.

FIGURE 8 shows a group of teeth 68 of constant height which have full addenda with respect to pitch line 66. The forward edges 69 of teeth 68 have full radii similar to the rear edge radii 71, and proper metal flow will thus be facilitated as these teeth engage the workpiece.

FIGURE 9 shows a group of teeth at the trailing end of tool 3 in order to illustrate the manner in which trailing rack ends are relieved in order to properly disengage themselves from the workpiece. These teeth, indicated at 72, are on a pitch line 73 which tapers downwardly with respect to pitch line 66. Radii 74 and 75 of teeth 72 are full and the stresses in the workpiece will be gradually relieved by the tapering nature of these teeth as the racks leave the workpiece.

It may be noted that in setting up the tools embodying the present invention, they will be in a direct vertical line with one another when forming an even number of teeth but one-half pitch apart when forming an odd number of teeth relative to the part axis. The process described may be used to generate spur or helical teeth and various other tooth forms, for example, serrations and oil grooves, by following the principles disclosed above. More than one set of splines or teeth can be rolled simultaneously on each part by using pairs of tools such as 1 and 3. The rolling in all cases can be carried out with the part at room temperature and the part can be made of various materials capable of being rolled. By far the greatest usage is in rolling steel bars, these preferably being at Rockwell "C" hardness 20–30, although harder and softer stock can be rolled. The tools themselves are, of course, preferably formed from high grade tool steel and have a hardness above Rc–60.

According to the invention, each tool 1 and 3 is formed with a plurality of sets of rack teeth, these sets being alternately usable, and releasable holding means generally indicated at 101 is provided for securing each rack in position with one set of teeth facing workpiece A. In the embodiment illustrated in FIGURES 1 and 2, each tool 1 and 3 has six sides, three sides, 102, 103 and 104 carrying the three sets of rack teeth, while narrower sides 105, 106 and 107 are disposed between these sets of teeth, the latter three sides being smooth-surfaced. Sides 102, 103 and 104 are all of identical width, as are narrower sides 105, 106 and 107, so that each rack 1 or 3 will be symmetrical about a vertical plane regardless of whether rack 102, 103 or 104 is facing workpiece A. The cross-sectional shape of each tool, and more particularly the angular orientation of this shape, will be identical for all three positions of the tool.

Slides 108 and 109 are supported by ways 15 and 17 respectively and are reciprocable by pistons 29 and 30. Each holder 101 comprises an elongated base 111 secured to its slide 108 or 109 by clamps 112, as seen in FIGURE 1. Each member 111 is flat, and has a relatively thin member 113 placed thereon, member 113 being likewise elongated and of the same width as member 111. Member 113 has longitudinally extending flanges 114 and a pair of elongated clearance notches 115 adjacent its centerline, these notches defining a flat supporting surface 116 for the tool.

Holder 101 further comprises a first clamp 117 of elongated shape engageable with member 113 between one flange 114 and one slot 115 thereof. Clamp 117 is recessed at 118 to accommodate tool 103, and has an outer tool engaging surface 119 inclined inwardly so as to engage a surface 105, 106 or 107 of the tool. A notch 121 in clamp 117 is engageable with the adjacent flange 114 of member 113, to locate clamp 117, and the clamp may be secured to member 111 by bolts 122. Clamp 117 may be further secured to member 48 by a plurality of bolts 123 disposed in counterbores within clamp 117 to prevent interference with tool 113.

Holder 101 further comprises a clamp support 124 of elongated shape and generally triangular cross-section, as seen in FIGURE 2. This clamp support is notched at 125 to engage the other flange 114 of member 113 so as to be disposed between the flange and the adjacent slot 115. Like clamp 117, clamp holder 124 has an inclined surface 126 parallel to the adjacent rack of 201, 202 or 203, and an outer inclined surface 127 which is parallel to the outwardly adjacent surface 105, 106 or 107 of the tool. Clamp support 124 is secured by bolts 128 to slide 111.

A second clamp 129 is secured to clamp support 124 by bolts 131. Clamp 129 is of elongated shape, having a first surface 132 engageable with surface 127 of clamp holder 124, and a second surface 133 engageable with adjacent surface 133 engageable with adjacent surface 105, 106 or 107 of tool 1 or 3. Elongated slots 134 are provided at spaced intervals along clamp 129 for receiving bolts 131 and permitting clamp 129 to be retracted when tool shifting is desired.

It has been found that the amount of metal used in fabricating a tool such as 1 or 3 is approximately twice the amount of metal which would be used to fabricate a separate tool having a single set of rack teeth. A substantial saving in material is thus effected by the invention. Furthermore, in grinding tools 1 or 3, it will only be necessary to make one set-up of the grinding apparatus. After one set of teeth on the tool is ground, the tool may then be merely released, turned over, and a second set of teeth ground. After turning over the tool once more, the third set may be ground. The invention will save not only considerable setup and grinding time, but eliminate shipping and receiving costs for three separate tools which have to be reground.

Tools 1 and 3 may be clamped in position in their respective holders 101, and longitudinally adjusted in these holders so that the teeth of the facing racks have a proper relationship to each other depending upon the number of teeth to be formed in workpiece A. The tool will be firmly supported against the workpiece by the engagement of surface 116 of members 113 with side 105, 106 or 107 of the tool. After sufficient workpieces have been made to require replacement of the rack teeth being used, tools 1 and 3 may be released from their holders 101 and turned 120° so that new set of rack teeth face the work. This process may be repeated when the second set of rack teeth is worn. After the third set of rack teeth is worn, the tools may be discarded, a substantial saving having nevertheless been effected as compared with the cost of two regrindings of tools having single sets of rack teeth, or of the fabrication of three upper and three lower tools each having a single set of teeth.

FIGURES 10 and 11 show a modified arrangement for supporting the tools of this invention in a manner such that they may be adjusted toward or away from each other to accommodate various workpiece diameters. The tools generally indicated at 201 and 202 are of the same construction as tools 1 and 3 in the embodiment of FIGURES 1 and 2 and need therefore not be described in detail. Holders generally indicated at 203 for the tools are also similar to holders 101 in the first embodiment, each holder comprising a first clamp 204, a clamp holder 205, and a second clamp 206 constructed similarly to members 117, 124 and 129 respectively, with exceptions which will be noted below.

Each slide, generally indicated at 207, comprises first and second gibs 208 and 209 respectively, these gibs being generally constructed in a manner similar to that described with respect to the gibs in the aforementioned copending patent application Serial No. 837,262. Each gib 208 is slidable on slideway 211 or 212 by means of cylinders 213 and 214 respectively, as in the previous embodiment. The engaging surfaces of each pair of gibs are slightly inclined so that the distances of tools 201 and 202 with respect to ways 211 and 212 respectively may be adjusted by longitudinal adjustment of gibs 209 with respect to gibs 208. In making the adjustment, consideration will be given to factors such as the tool height, the minor diameter of the spline to be rolled, and the distance between the facing surfaces of gibs 209. Verniers 215 are provided for aiding in the gib adjustment, this adjustment being accomplished by means described below.

The main portion of each gib 209 has a surface 216 parallel to its corresponding way 211 or 212, this surface having a central portion 217 defined by two notches 218 in parallel relation. The bearing surface 219, 221, or 222 of each tool 201 or 202 is engageable with surface 217, notches 218 providing clearance for the tool edges as in the previous embodiment. First clamp 204 is secured to gib 209 by bolts 223, and clamp holder 205 is secured to gib 209 by bolts 224 in recesses 225 of holder 205.

Since the relationship between the teeth of facing racks on tools 201 and 202 must be maintained despite gib adjustments, surface 216 of each gib 209 is made somewhat longer than it corresponding tool, so that the gibs may be adjusted while the tools maintain their relative position.

Clamping members generally indicated at 226 and 227 are provided at opposite ends of each tool for holding the tools in their adjusted position on surface 216. Each clamping member 226 comprises a block 228 secured to gib 208 at the trailing end thereof, this block having an end surface 229 engageable with the adjacent end of the tool. A size adjustment screw 231 is mounted in each block 226 and is threadably connected with the corresponding gib 209 so that rotation of screw 231 will cause longitudinal shifting of gib 209 with respect to gib 208 as indicated by vernier 215. A locking nut 232 is provided for holding each screw 231 in its adjusted position.

Each member 227 comprises a block 233 secured to the end of gib 209 remote from member 226. Block 228 may be referred to as a heel block whereas block 233 may be termed a toe block. Each block 233 has a heeling screw 234 threadably mounted therein, this screw extending from the block and being engageable with the adjacent surface of the tool. A locking nut 235 is mounted on screw 234 for locking the screw in its adjusted position. With this arrangement, it will be seen that each tool 201 and 202 may be held in its proper position with respect to the workpiece despite adjustments between gibs 208 and 209.

As in the previous embodiment, clamps 204 are secured to members 236 and 237 respectively which may travel with the tools and carry facing racks (not shown) for synchronizing purposes. In order to permit relative adjustment between members 204 on the one hand and members 236 and 237 on the other hand, in direction both parallel to and transversely to the tools, slots 238 and 239 may be provided for receiving fastening bolts 241, these slots being at right angles to each other and formed in members 204 and members 236 and 237.

The operation of the embodiment of FIGURES 10 and 11 will be similar to that of the previous embodiment. After adjusting the relative heights of the tools by gibs 208 and 209 and the longitudinal positions of the tools by clamps 226 and 227, the workpieces may be formed with a first pair of facing rack teeth set on tools 201 and 202. When these racks are no longer usable, the tools may be released from holders 202 and rotated 120° so as to present two new sets of teeth for the forming operation. After the third sets of teeth have been used, the tools may be discarded.

An advantage of the embodiments of FIGURES 10 and 11 is the incorporation of height adjusting means, represented by gibs 208 and 209, as part of holders 203, gibs 209 serving the function of bearing means in these holders, thus eliminating additional parts which would ordinarily be needed for this purpose.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. In a tool for pressure forming teeth on the periphery of a cylindrical workpiece, an elongated member having a cross-sectional shape composed of three relatively wide sides interposed between three relatively narrow sides, and a set of rack teeth formed on each of the wide sides, each set having a leading tooth and a trailing tooth, a first group of teeth between said leading and trailing teeth being fully conjugate to the teeth to be formed on said workpiece and having a pitch line corresponding to the diameter of a circle which encompasses a cross-sectional area of the interdental space between the teeth of the workpiece equal to the cross-sectional area of the portions of the teeth of the workpiece outside the circle, the tips of said first group of teeth being equally spaced from said pitch line, a second group of teeth between said first group and said leading tooth being formed so that the tips thereof lie on a line sloping toward an extension of said pitch line.

2. The combination according to claim 1, further provided with a holder for said tool comprising a bearing member engageable with a first one of said narrow sides, and clamping means connected to said bearing member and engageable with the other two narrow sides, said clamping means urging said first narrow side against said bearing member.

References Cited in the file of this patent

UNITED STATES PATENTS

| | | |
|---|---|---|
| 440,763 | Simonds | Nov. 18, 1890 |
| 1,240,913 | Anderson | Sept. 25, 1917 |
| 1,410,350 | Smith | Mar. 21, 1922 |
| 1,558,086 | Gustavsen | Oct. 20, 1925 |
| 1,619,997 | White | Mar. 8, 1927 |
| 1,746,391 | Gibbs | Feb. 11, 1930 |
| 2,581,609 | Small | Jan. 8, 1952 |
| 2,760,388 | Seibert | Aug. 28, 1956 |
| 2,982,008 | Facknitz | May 2, 1961 |